(12) United States Patent
Szabó

(10) Patent No.: US 12,427,514 B2
(45) Date of Patent: Sep. 30, 2025

(54) PIEZOELECTRIC MICROPIPETTE

(71) Applicant: CELLSORTER KFT., Budapest (HU)

(72) Inventor: Bálint Szabó, Budapest (HU)

(73) Assignee: CELLSORTER KFT., Budapest (HU)

( * ) Notice: Subject to any disclaimer, the term of this patent is extended or adjusted under 35 U.S.C. 154(b) by 1081 days.

(21) Appl. No.: 17/624,964

(22) PCT Filed: Feb. 15, 2019

(86) PCT No.: PCT/HU2019/000002
§ 371 (c)(1),
(2) Date: Jan. 5, 2022

(87) PCT Pub. No.: WO2020/165617
PCT Pub. Date: Aug. 20, 2020

(65) Prior Publication Data
US 2023/0027598 A1    Jan. 26, 2023

(51) Int. Cl.
*B01L 3/02* (2006.01)
*G01N 35/00* (2006.01)

(52) U.S. Cl.
CPC ........ *B01L 3/0268* (2013.01); *G01N 35/0099* (2013.01); *B01L 2300/0838* (2013.01); *B01L 2400/0439* (2013.01)

(58) Field of Classification Search
CPC .......... B01L 3/0268; B01L 2300/0838; B01L 2400/0439; B01L 3/0244; B01L 3/02; G01N 35/0099; F21V 19/0015; F21V 33/0068
See application file for complete search history.

(56) References Cited

U.S. PATENT DOCUMENTS

| | | | | |
|---|---|---|---|---|
| 4,852,620 A * | 8/1989 | Jakubowicz | ............ | B01L 3/021 422/922 |
| 7,479,256 B1 * | 1/2009 | Gruhler | ................ | B01J 19/0046 347/85 |
| 2002/0131903 A1 | 9/2002 | Ingenhoven et al. | | |
| 2003/0142488 A1 * | 7/2003 | Feger | ................... | G02B 21/084 362/89 |
| 2003/0190264 A1 * | 10/2003 | Yiu | ........................ | B01L 3/0227 422/525 |
| 2005/0257340 A1 * | 11/2005 | Parrott | ................. | A47L 7/0038 15/353 |
| 2006/0012167 A1 * | 1/2006 | Muller | .................... | F16L 37/05 285/197 |
| 2013/0195733 A1 * | 8/2013 | Siemers | ............. | G01N 35/1074 422/507 |
| 2015/0210437 A1 * | 7/2015 | Tajima | .................. | B01L 3/0275 222/1 |
| 2016/0320381 A1 * | 11/2016 | Holmes | ................... | G01N 35/10 |
| 2017/0203322 A1 * | 7/2017 | Ivri | ...................... | B01J 19/0046 |
| 2019/0314808 A1 * | 10/2019 | Wilmer | ................. | B01L 3/0275 |

FOREIGN PATENT DOCUMENTS

| | | |
|---|---|---|
| EP | 1 481 804 A1 | 12/2004 |
| WO | 84/00119 A1 | 1/1984 |

OTHER PUBLICATIONS

Park J, Yoshida K, Yokota S. "Resonantly driven piezoelectric micropump Fabrication of a micropump having high power density." Mechatronics. 1999; 9: 687-702. (Year: 1999).*

Wang XY, Ma, YT, Yan, GY, Huang D, Feng ZH. "High flow-rate piezoelectric micropump with two fixed ends polydimethylsiloxane valves and compressible spaces." Sensors and Actuators A. 2014; 218: 94-104 (Year: 2014).*

ISR for International Application PCT/HU2019/000002 mailed Nov. 5, 2019.

Written Opinion for International Application PCT/HU2019/000002 mailed Nov. 5, 2019.

* cited by examiner

*Primary Examiner* — Lyle Alexander
*Assistant Examiner* — Alison Claire Gerhard
(74) *Attorney, Agent, or Firm* — LADAS & PARRY LLP

(57) ABSTRACT

The invention relates to a piezoelectric micropipette, which comprises a capillary tube forming the pipette, and an expansion chamber connected to the capillary tube, the expansion chamber having a flexible element and being connected to a piezoelectric actuator. According to the invention the flexible element of the micropipette is arranged in the expansion chamber, and the flexible element is connected to a rigid displacing element, and a piezoelectric actuator is connected to the rigid displacing element.

20 Claims, 4 Drawing Sheets

Figure 6:
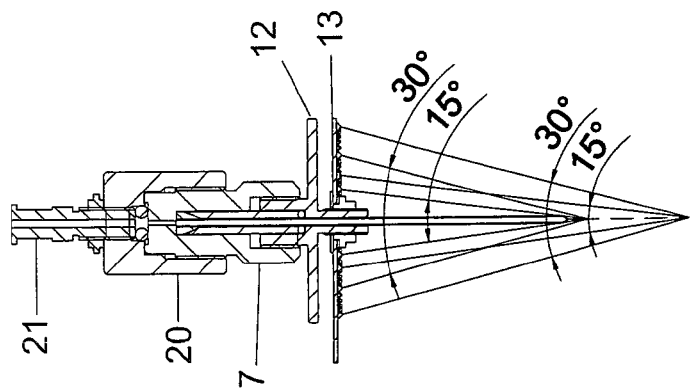

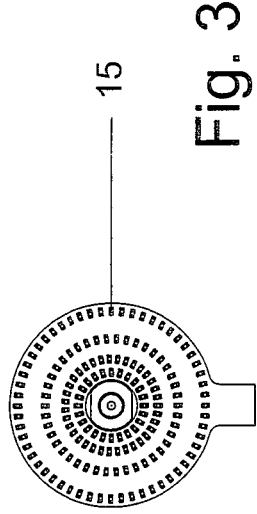
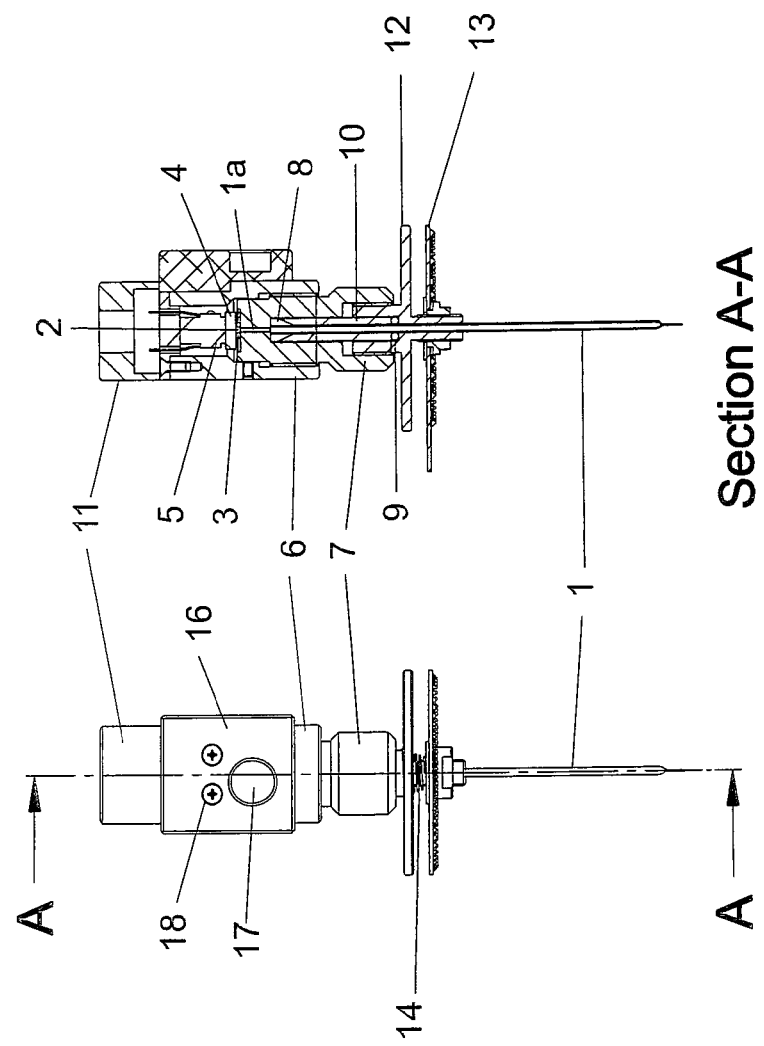

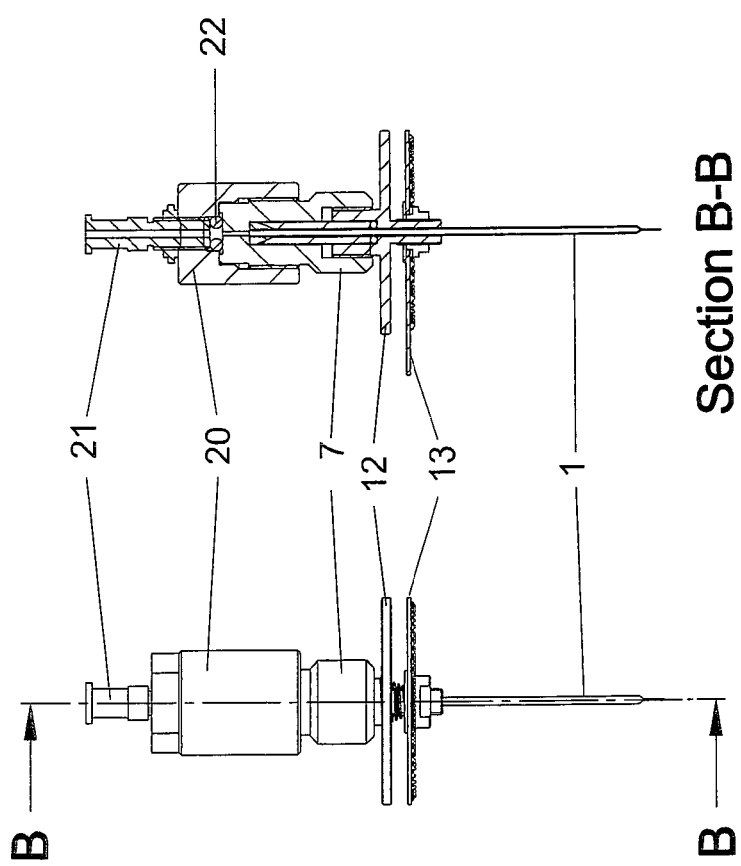

PIEZOELECTRIC MICROPIPETTE

This application is a continuation of International Patent Application No. PCT/HU2019/000002 filed on 15 Feb. 2019, the disclosure of which are incorporated herein by reference in its entirety.

FIELD OF THE INVENTION

The present invention relates to a micropipette for accurate pulling or dispensing of small amounts of liquid samples, in particular a micropipette working on the piezoelectric principle. When analysing liquid samples, especially biological samples, taking up and dispensing of very small amounts in the nano litre range is often required, possibly with the accuracy of a few pico litres.

A further requirement is often the delivery of liquids, chemical, biochemical reagents in a small amount with a high accuracy. Pipettes generally used in laboratories can be used for samples with a volume of up to ~0.1 micro litre, but volumes significantly below this value cannot be delivered in a reliable manner. The reason for this is that the behaviour of microscopic liquid drops below 1 micro litre is determined mainly by the surface tension and the adhesion forces on the solid surfaces unlike to samples of larger volume, the behaviour of which is determined by body forces. The capillary length of pure water at normal temperature and pressure is approx. 2 mm. This means that for the behaviour of the smaller water drops it is not the gravity but the surface tension which is decisive. In addition to the surface forces, the evaporation of the tiny droplets is also problematic. A water droplet of a volume below 1 micro litre evaporates under laboratory conditions in a few minutes.

BACKGROUND ART

There are also microinjectors available for the injection of very small amounts. Such a microinjector is for example an Eppendorf Femtojet, that is capable of injecting liquids with a femto litre accuracy through a micropipette. In this microinjector a stable and very slow flow is generated, and the volume of injected liquid is regulated through the injection time. These solutions however, are not appropriate for the take-up of very small samples in the pico litre range and below, and a consecutive dispensing of the same sample. The reason for this is that a consecutive application of a suction and injection of a sample can only be performed with a significant hysteresis. Because of the large volume of the whole liquid system and the expansion of the elastic delimiting means, such as pipes, sealings will not make it possible to reverse the liquid flow direction and maintaining the regulation of volume with a high accuracy at the same time. This is not a problem with volumes above the micro litre range, it creates however a serious technical barrier in the nano litre range.

In automatic sample taking and dispensing systems controllable pipettes are used. These are capable of taking up different volumes depending on the construction and the principle of operation.

With some of the controllable pipettes, the desired volume change necessary for taking up and dispensing a sample is achieved by moving a piston in a cylinder. According to U.S. Pat. No. 7,125,727 a metering piston moved by a piezoelectric actuator is applied to control liquid flow within the needle. The typical stroke (maximum longitudinal deformation) of piezoelectric actuators is however only a few micrometres. In order to increase the dispensing accuracy, it is preferred to use a cylinder with a small diameter. The diameter of the cylinder (and of the piston) can however, because of practical reasons, not be below the mm scale. Further, between the surface of the piston and the cylinder a sealing member has to be applied. The sealing typically is made of a resilient material, therefore it is easily deformed. Typically, the volume change caused by the deformation of a sealing having a dimension in the mm range is comparable with the volume change caused by the piston movement in the micrometer range or below. Such a volume change degrades the accuracy of the delivery of the liquid significantly. The amount of liquids delivered in the picolitre range or below can only be determined with a very low accuracy on the basis of the position of the piston. The piston or the cylindrical body has to slip along the resilient sealing. The accuracy of a piezoelectric actuator could be utilized for piston movement rather in the nanometre range. Upon such a tiny relative displacement of the piston, the moving surface, due to a high adhesive coefficient of friction of the sealing, will (presumably) not slide but it will rather cause the deformation of the sealing. It cannot be determined with certainty, at what extent of displacement the slipping between the sealing and the contacting surface will occur. This seriously degrades the accuracy of liquid handling. The accuracy of liquid delivery can in principle be increased by using a so-called special Hamilton syringe instead of a conventional piston. In this case a high precision PTFE piston is used that serves as a sealing at the same time. However, when changing the direction of movement, even the Hamilton syringe will deliver liquids with a low accuracy in the picolitre range.

In a different known device, one side of the expansion chamber connected to the pipette is terminated by a membrane or one side wall is configured as a membrane. Such a micropipette working on the piezoelectric principle is known from U.S. Pat. No. 7,125,519. In this device the capillary of the micropipette is connected through a liquid channel to an expansion chamber, a wall of which being configured as a membrane. The outer surface of the membrane is provided with a piezoelectric element, which upon application of a voltage changes its dimension and thereby the form of the membrane. Due to the change of the shape of the membrane, the volume of the expansion chamber changes as well, which will result in aspiring or injecting the liquid. The amount of liquid aspired or injected is determined by the dimensions of the expansion chamber and the deformation of the membrane, or more precisely the volume change of the expansion chamber.

One of the disadvantages of this device is that it cannot be taken apart, because the parts of it are glued together. Accordingly, filling up the device with a liquid and cleaning it between the consecutive applications may be rather cumbersome. It should be a disposable device, when it is used for pipetting of reagents that can contaminate the inside of the device. If the device is filled with air, the accuracy of liquid delivery will be rather low because of the compressibility of the air and the high Laplace pressure at the small cross-section of the tip of the pipette (due to surface tension). Other prior art solutions are disclosed in U.S. patent publication 20160320281A by Holmes et al.: describing a fluid handling system and method for multi-analysis and non-patent literature by Wang et al.: High flow-rate piezoelectric micropump with two fixed ends polydimethylsiloxane valves and compressible spaces.

SUMMARY OF THE INVENTION

When creating the invention, we started from a micropipette working on a piezoelectric principle, which comprises a housing with a lower housing member and an upper housing member releasably connected to the lower housing member, a capillary tube forming the pipette, and an expansion chamber formed in the lower housing member. The expansion chamber is connected to the capillary tube through the lower housing member. The expansion chamber also comprises a flexible element which is connected to a piezoelectric actuator.

According to the present invention the deficiencies of the prior art can be eliminated by a piezoelectric micropipette with a compressible flexible element being arranged in the expansion chamber, the flexible element being connected to a rigid displacing element, and a piezoelectric actuator being connected to the rigid displacing element. With such an arrangement it will be possible to create (practically) any small size expansion chamber, within which by a suitable small displacement of the rigid displacing element a corresponding small volume of liquid samples e.g. in the nanolitre range can be taken up and dispensed.

According to one aspect of the invention the expansion chamber has a substantially cylindrical shape, the flexible element arranged in the expansion chamber is configured as an O-ring, and the rigid displacing element is configured as a pressing plate having the form of a substantially circular disc. In such a configuration the expansion chamber, e.g. the amount of liquid that can be taken up or dispensed, and the accuracy of dispensing will be determined practically by the dimensions of the O-ring.

The O-ring arranged in the expansion chamber can be an O-ring having a dimension that can be selected arbitrarily in a range of dimensions between a minimum and a maximum dimension, and can be replaceable if necessary, wherein the cylindrical expansion chamber is configured for receiving an O-ring of different sizes, and the inner diameter of the cylindrical side wall of the expansion chamber substantially corresponds to the outer diameter of the largest O-ring.

The bottom wall of the cylindrical expansion chamber contacting the O-ring has a substantially plane surface with concentric grooves provided in the contact surface of the cylindrical expansion chamber for positioning the O-rings of different sizes concentrically.

In accordance with the present invention, the capillary tube forming the micropipette is attached to the expansion chamber in a releasable manner, wherein a capillary bore is formed in the lower housing member serving as a pipette holder for connecting the capillary tube with the expansion chamber.

According to a further advantageous embodiment of the invention, the lower housing member forming the pipette holder, is releasably connected to the upper housing member.

In this embodiment the upper housing member is configured for holding the piezoelectric actuator and is provided with a receiving chamber for receiving the piezoelectric actuator.

In a further advantageous embodiment, the upper housing member is configured for filling the micropipette with an inlet connecting element.

It is also advantageous to provide a piezoelectric micropipette according to the present invention, in which the capillary tube is fixed to the lower housing member serving as a pipette holder with a releasable fixing element, such as a threaded fixing element.

In the lower housing member serving as a pipette holder, a corresponding receiving space is formed for receiving the capillary tube In the lower housing member, the receiving chamber for receiving the capillary tube is also provided with a sealing and/or fixing element between the capillary tube and the receiving chamber.

According to a further aspect of the invention, in the receiving chamber in the lower housing member for receiving the capillary tube forming the pipette, one of the sealing and/or fixing elements is provided preferably with a conical shape and the other sealing and/or fixing elements is configured preferably as an O-ring.

In this configuration, in the in the receiving chamber for receiving the capillary tube, between the conical sealing member and the O-ring a guiding sleeve is arranged for holding and guiding the capillary tube.

In the lower housing member in the receiving chamber for receiving the capillary tube forming the pipette, the guiding sleeve, for holding and guiding the capillary tube between the conical sealing member and the O-ring, has an end section in proximity of the conical sealing member with a conical shape corresponding to the conical shape of the conical sealing element and has an end face in proximity of the O-ring with an at least partly plane surface and substantially perpendicular to the longitudinal direction.

According to a further embodiment of the invention, the pipette fixing element is provided with a lighting means, preferably a LED lighting means, which is capable of illuminating the tip of the pipette.

The lighting means may have a carrier plate configured as a circular disk with LED lighting elements arranged in at least one concentric circle.

The LED lighting elements in the lighting means are arranged and configured preferably for phase contrast illumination.

SHORT DESCRIPTION OF THE DRAWING

Figure 7:
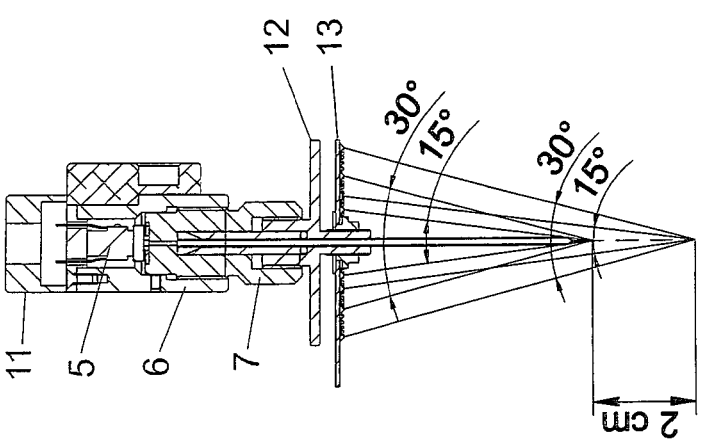
Figure 9:
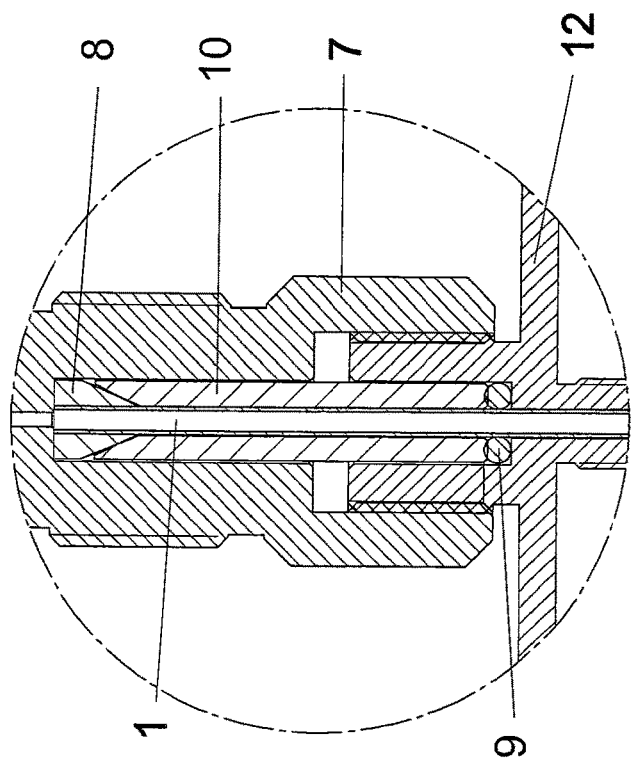
Figure 8:
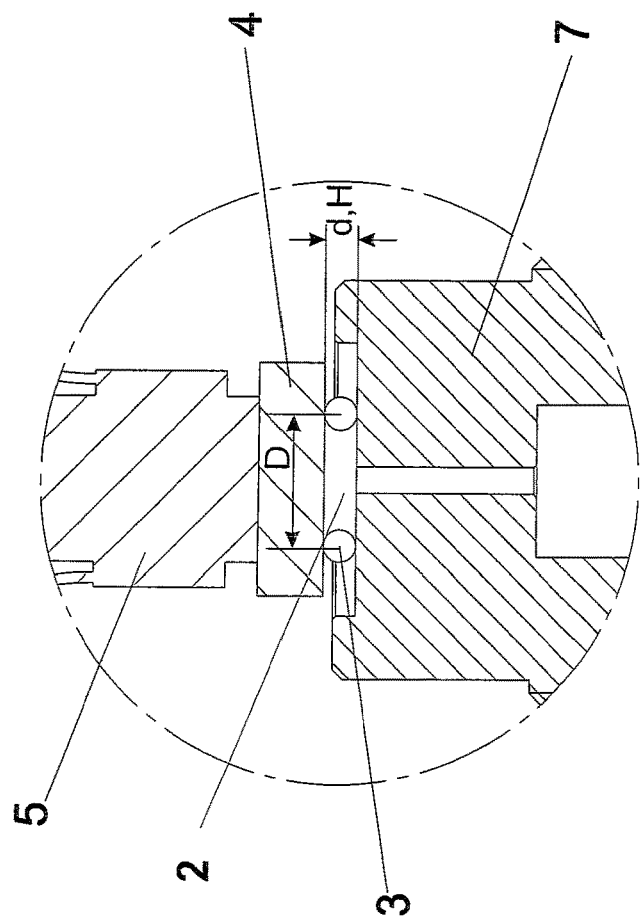

Examples of embodiments of the invention are described in more detail hereinafter with reference to the accompanying drawings wherein:

FIG. 1 is a side view of the piezoelectric micropipette according to one aspect of the invention, FIG. 2 is a cross sectional side view of the piezoelectric micropipette of FIG. 1, FIG. 3 is a bottom view of the piezoelectric micropipette of FIG. 1 with a lighting means, FIG. 4 is a side view of a piezoelectric micropipette with a filling inlet connecting element, FIG. 5 is a cross sectional side view of a piezoelectric micropipette of FIG. 4, with a filling inlet connecting element, FIG. 6 is a cross sectional side view of a piezoelectric micropipette with a pipette tip illuminated by the lighting elements, FIG. 7 is a cross sectional side view of a piezoelectric micropipette with a filling inlet connecting element and a pipette tip illuminated by the lighting elements, FIG. 8 is an enlarged view of the expansion chamber and the surrounding elements of the micropipette according to the invention, and FIG. 9 is an enlarged view of the pipette holder and connected components of the piezoelectric micropipette.

DESCRIPTION OF THE EMBODIMENTS OF THE INVENTION

FIG. 1 is a side view of the piezoelectric micropipette according to one aspect of the invention, with a capillary tube 1 forming the pipette, an upper housing member 6 for receiving a piezoelectric actuating element, a lower housing member 7 formed as a pipette holder a threaded fixing element 12, a holding plate 13 and a cover 11 with a recess 17. The front side of the housing 6 is provided with a fixing surface 16 with fixing screws 18. In this embodiment a spring 14 is arranged between the fixing element 12 and the holding plate 13. The spring 14 urges the holding plate 13 comprising the LED lighting elements in a downward direction. In this manner the vertical position of the lighting elements is stabilized. The holding plate 13 is fixed by a threaded nut, which is also used for adjusting the height of the illuminating plate. The spring thereby presses the holding plate 13 against the nut.

The fixing surface 16 can be used for fixing the piezoelectric micropipette of the invention on a robotic arm which is movable along at least one coordinate and which enables a program controlled movement of the piezoelectric micropipette in space between desired positions so that the system can also be configured and used for automatic pipetting.

FIG. 2 shows a cross sectional side view of the piezoelectric micropipette of FIG. 1. As it is clear from the drawing, the upper end of the capillary tube 1 is arranged in the lower housing member serving as a pipette holder 7. In the pipette holder 7, coaxially with the capillary tube 1, a capillary bore 1a is formed which communicates with a preferably cylindrical expansion chamber 2. In the expansion chamber 2 a flexible element 3 is arranged in the form of an O-ring, which is mechanically contacted by a rigid displacing element 4 which is formed as a pressing plate in the form of a circular plate or disk. The rigid displacing element 4 is connected to a piezoelectric actuator 5 which is arranged in an upper housing member 6. The upper housing member 6 is mechanically connected to the lower housing member or pipette holder 7. In order to establish the mechanical connection, the upper housing member 6 is provided with an internal thread and the lower housing member 7 is provided with an external thread.

The expansion chamber 2 is thereby terminated by the upper end face of the lower housing member 7, the O-ring 3 arranged in the expansion chamber 2, and the rigid displacing element 4. The dimension of the O-ring 3 arranged in the expansion chamber 2 can be selected in a range of dimensions between a minimum dimension and a maximum dimension. Further, the O-ring can be replaced if necessary. The cylindrical expansion chamber 2 is preferably configured for receiving O-rings 3 of different dimensions, wherein the inner diameter of the cylindrical side wall of the expansion chamber 2 corresponds to the outer diameter of the largest selectable O-ring 3.

The expansion chamber 2 is provided by a cylindrical recess formed in the upper end of the lower housing member 7 and serves for receiving the O-ring 3, and has a substantially plane contact surface for the O-ring 3.

In a preferred embodiment of the micropipette of the invention, the substantially plane contact surface for the O-ring 3 in the expansion chamber 2 is provided with concentric grooves (not shown) for concentric positioning of the O-rings 3 of different dimensions.

The upper end of capillary tube 1 can be inserted into and arranged in the cylindrical receiving chamber of the lower housing member 7. In order to enable a correct positioning of the capillary tube 1, upper and lower sealing and/or fixing elements 8 and 9 are inserted and arranged in the receiving chamber. As shown in FIG. 2, a conical sealing 8 element can be arranged at the upper end of the capillary tube 1. The conical sealing element has a planar upper end face for contacting the substantially planar contact surface of the upper end of the cylindrical receiving chamber, and a lower conical outer surface for contacting a conical inner surface on the upper end of a guiding sleeve 10 for guiding the capillary tube 1. The conical outer contact surface at the lower end of the conical sealing 8 element tapers in downward direction and the conical inner contact surface of the guiding sleeve 10 expands correspondingly in the upward direction. The conical sealing element 8 and the conical end face of the guiding sleeve 10 have similar cone angles. The conical sealing element 8 is used for sealing, fixing and positioning the upper end of the capillary tube 1 with high precision coaxially with the capillary bore 1a of the lower housing member 7. The lower end of the guiding sleeve 10 is terminated by a planar surface substantially perpendicular to the longitudinal direction, and is contacted by a lower sealing and fixing element being configured as an O-ring 9. The O-ring 9 is secured by a fixing and retaining element 12 which can be releasably connected to the lower housing member 7 and it is used for pressing the O-ring 9 to the planar end face of the guiding sleeve 10. The fixing and retaining element 12 is preferably a threaded component, which in the shown embodiment is provided with an external threading for connecting an internal threaded portion at the lower end of the lower housing member 7. The fixing and retaining element 12 has an upper threaded portion, a lower threaded portion and a middle portion extending in a cross direction. The lower threaded portion can receive a holding plate 13 for holding lighting means.

A piezoelectric actuator 5 can be arranged in a receiving chamber of an upper housing member 6, which can be attached releasably to the lower housing member 7. For this purpose, the upper housing member may be provided with an internal threaded portion and can serve as a closing member. The piezoelectric actuator 5 may be supplied with a DC control voltage, upon which it is compressed or expanded in the longitudinal direction. The control voltage of the piezoelectric actuator 5 may be introduced through an opening in the cover 11 of the upper housing member 6 by means of a not shown voltage source cable. Due to the change of the longitudinal dimension of the piezoelectric actuator 5 the O-ring 3 located in the expansion chamber 2 will be compressed to a different extent, which results at the same time in a change of the volume of the expansion chamber 2. On the other hand, the volume change of the expansion chamber 2 will result in a take up or release of liquid present in the capillary tube 1 and the capillary bore 1a.

FIG. 3 shows a lighting means to be used in connection with the piezoelectric micropipette of the invention, which can be preferably formed as a LED lighting means. As it is shown in FIG. 3, the lighting means has a preferably circular holding plate 13 with LED lighting elements 15 arranged in at least one concentric circle. The LED lighting elements 15 provide for a proper illumination of the tip of the pipette, which may be advantageous especially when microscopic images are taken. In certain applications it may be advantageous to arrange and configure the LED lighting elements 15 for providing phase contrast illumination. As shown in the drawing, the LED lighting elements 15 are arranged in four (two pairs of) concentric circles with predefined different dimension.

The lower housing member or pipette holder 7 of the micropipette is connected releasably, in the present embodiment by means of a threaded connection, to the housing 6 which receives the piezoelectric actuator 5, and thus the housing 6 can be removed and replaced by another upper housing member 20 connecting with a threaded portion to the pipette holder 7 as shown in FIGS. 4 and 5. The threaded upper housing member 20 is provided at the upper end with a filling inlet 21, which can be connected e.g. to a standard syringe for filling the micropipette with a liquid. The accurate operation of the micropipette requires that the whole inner volume of the micropipette is filled bubble-free with a liquid. As gases are compressible, the eventually remaining bubbles can degrade the dispensing accuracy of the micropipette. During filling of the micropipette of the invention, the O-ring 3 in the expansion chamber 2 is replaced by another O-ring 22 for filling purposes. The filling head consisting of the upper housing member 20 and the filling inlet 21 is only needed for filling and eventually a cleaning process in connection with the micropipette. Before the first use of a new micropipette, which is free from any liquid (dry state), the micropipette has to be filled through the filling head entirely and bubble-free with a liquid appropriate for the sample taking process, e.g. with water. After finishing the sample taking process, the micropipette is preferably emptied and washed and also the washing liquid is emptied. As the parts of the micropipette of the inventions are designed to be assembled and disassembled, the individual components can be separately cleaned, sterilized or simply replaced.

FIGS. 6 and 7 illustrate the beams of light emitted by the lighting means of the micropipette of the invention. FIG. 3 shows a bottom view of the LED lighting elements 15 which are arranged in four concentric circles such that the individual circles of LED lighting elements 15 and the tip of the capillary tube 1 define a predetermined cone angle. The cone angles of an inner circle and an outer circle of a circle pair in the shown embodiment are 15 degree and 30 degree, respectively. The diameter of the concentric circles is determined so that the light beams of the LED lighting element 15 of an inner circle and an outer circle of a circle pair intersect at the tip of the capillary tube 1, and the light beams of the LED lighting elements 15 of an inner circle and an outer circle of another circle pair intersect at a predetermined distance from the tip of the capillary tube 1. The predetermined distance in the shown embodiment is 20 mm. Such an arrangement is necessary for phase contrast microscopic imaging of a sample at the tip of the capillary tube 1 or 20 mm below that.

The function of the piezoelectric micropipette of the invention will now be described in more detail with reference to FIG. 8, depicting the expansion chamber 2, the O-ring 3, the pressing plate 4 and the piezoelectric actuator 5 in an enlarged view. Below we will provide the mathematical formula for the calculation of the volume of liquid which can be delivered with the piezoelectric micropipette of the invention.

The calculations are made under the condition that the O-ring has a dimension of 1×1 mm, which is one of the smallest size available on the market. As it is verified by the result of the calculations, the smallest amount of liquid is delivered with the smallest sized O-ring, and the largest dispensing accuracy can be achieved with the piezoelectric actuator having the smallest moving range or stroke.

Having an O-ring which is terminated by two parallel plates, the enclosed volume can be calculated as follows:

$$V=(D/2+d/2)^2*Pi*H=Pi \text{ mm}^3 \approx 3.14 \text{ microlitre.}$$

with D=1 mm (diameter of the opening of the O-ring)
d=1 mm (thickness of the O-ring)
H=1 mm (thickness of the O-ring)

The above volume V however still comprises half of the volume of the O-ring, because we have calculated the volume of a cylindrical space between the plates within the contact line with the O-ring. The volume of the O-ring (torus): $v=2*Pi^2*D/2*(d/2)^2=(Piz)/4$ microlitre Finally we obtain the volume of liquid enclosed by the O-ring: $V-v/2=Pi-(Pi^2)/8 \approx 1.9$ mm$^3$ (microlitre)

The enclosed liquid volume in the expansion chamber 2 is therefore 1.9 microlitre, or about 2 microlitre.

Under the condition that the volume of the O-ring does not change and the compression deformation is symmetric, the liquid volume change is the following: $DeltaH*(D/2+d/2)^2*Pi-DeltaH*Pi$ (microlitre)

The maximum longitudinal movement (DeltaH_max) of the piezo-element used in the example is 5 micrometre and the accuracy is about 1 nanometre. Therefore the piezo-element is capable of delivering about 15 nanolitre liquid. The dispensing accuracy is about 3 picolitre.

When using a piezo-element with a smaller stroke, the maximum volume of delivery is reduced and the dispensing accuracy is increased. A positioning accuracy of 0.1 nanometre or even better can be achieved with a piezo-element. When using the above O-ring it means an accuracy of 0.3 picolitre.

In the examples of the invention it is preferred to use piezo-elements with DC control and unipolar control circuit in order to avoid hysteresis caused by a pole change. The voltage-displacement curve of the piezo-elements, even in that case, is not completely linear, therefore an advance calibration might be necessary. In practical applications of the invention we have used a piezo-element of the type PICMA® P882 and P888.

The main advantages of the piezoelectric micropipette are the possibility of electrical control, the speed, the simple construction and the cost efficient application. The micropipette of the invention can be used with both transmitted and reflected light imaging, practically on an inverted microscope. It is also compatible with the microscopic imaging where the optical axis is coaxial with the axis of the micropipette. The surface of the micropipette contacting the liquid sample is entirely of inert material: the capillary tube is made of glass, the pipette holder, the expansion chamber and the pressing plate is made of stainless steel or plastic, the O-ring and the conical sealing is made of gum or poly-tetra-fluor-ethylene TEFLON® (PTFE).

LIST OF REFERENCES 1 capillary tube (micropipette)
1a capillary bore
2 expansion chamber
3 flexible element (e.g. O-ring)
4 rigid displacing element (pressing plate)
5 piezoelectric actuator
6 upper housing member
7 lower housing member (serving as a pipette holder)
8 conical sealing
9 O-ring
10 guiding sleeve
11 cover
12 (threaded) fixing and retaining element
13 holding plate
14 spring
15 lighting element (LED)
16 fixing surface
17 recess
18 screw
20 upper housing member
21 filling inlet
22 O-ring

The invention claimed is:

1. A piezoelectric micropipette comprising a housing with a lower housing member and an upper housing member releasably connected to the lower housing member, a capillary tube and an expansion chamber connected to the capillary tube through the lower housing member, the expansion chamber having a flexible element and being connected to a piezoelectric actuator characterised in that the expansion chamber is formed in the lower housing member, the flexible element is a solid ring-shaped compressible flexible element of a substantially constant cross-section in operation for aspirating and dispensing very small amounts of a liquid down to the nanoliter range with an accuracy down to the picoliter range, arranged in the expansion chamber, and a rigid displacing element is arranged between the flexible element and the piezoelectric actuator.

2. The piezoelectric micropipette of claim 1, wherein the expansion chamber has a side wall of a substantially cylindrical shape, the flexible element arranged in the expansion chamber is configured as an O-ring, and the rigid displacing element is configured as a pressing plate having the form of a substantially circular disc.

3. The piezoelectric micropipette of claim 2, wherein the O-ring arranged in the expansion chamber is configured as a replaceable O-ring having an outer diameter that can be selected arbitrarily in a range of diameters between a minimum and a maximum diameter, wherein the cylindrical expansion chamber is configured for receiving an O-ring of different sizes, and the inner diameter of the cylindrical side wall of the expansion chamber substantially corresponds to the largest outer diameter of the O-ring.

4. The piezoelectric micropipette of claim 3, wherein a bottom wall of the cylindrical expansion chamber contacting the O-ring has a substantially planar surface.

5. The piezoelectric micropipette of claim 3, wherein a bottom wall of the cylindrical expansion chamber contacting the O-ring is provided with concentric grooves for positioning the selected O-ring concentrically.

6. The piezoelectric micropipette of claim 1, wherein a capillary bore is formed in the lower housing member for connecting the capillary tube with the expansion chamber and the capillary tube (1) is releasably connected to lower housing member serving as a pipette holder.

7. The piezoelectric micropipette of claim 1, wherein the lower housing member forming a pipette holder (7) is releasably connected to the upper housing member.

8. The piezoelectric micropipette of claim 7, wherein the upper housing member is configured for holding the piezoelectric actuator and which is provided with a chamber for receiving the piezoelectric actuator.

9. The piezoelectric micropipette of claim 7, wherein the upper housing member is configured for filling the micropipette, and is provided with an inlet connecting element.

10. The piezoelectric micropipette of claim 7, wherein the capillary tube (1) is fixed releasably connected to the lower housing member by a threaded fixing element.

11. The piezoelectric micropipette of claim 10, wherein in the lower housing member a receiving chamber is formed for receiving the capillary tube.

12. The piezoelectric micropipette of claim 11, wherein in the lower housing member the receiving chamber for receiving the capillary tube is also provided with at least one sealing and/or fixing element between the capillary tube (1) and a wall of the receiving chamber.

13. The piezoelectric micropipette of claim 12, wherein, in the receiving chamber in the lower housing member for receiving the capillary tube (1), a first one of the sealing and/or fixing elements is configured as a conical sealing and/or fixing element and a second one of the sealing and/or fixing elements is configured as an O-ring.

14. The piezoelectric micropipette of claim 13, wherein in the lower housing member a receiving chamber for receiving the capillary tube (1) is provided with a guiding sleeve between the conical sealing element and the O-ring for fixing and guiding the capillary tube (1).

15. The piezoelectric micropipette of claim 13, wherein in the lower housing member in a receiving chamber for receiving the capillary tube (1), a guiding sleeve for holding and guiding the capillary tube (1) between the conical sealing member and the O-ring, has an end section in proximity of the conical sealing member with a conical shape corresponding to the conical shape of the conical sealing element and has an end face in proximity of the O-ring with an at least partly planar surface substantially perpendicular to the longitudinal direction.

16. The piezoelectric micropipette of claim 10, wherein a lighting device is connected to the threaded fixing element.

17. The piezoelectric micropipette of claim 16, wherein the lighting device is a LED lighting means device.

18. The piezoelectric micropipette of claim 17, wherein the lighting device has a circular carrier plate with LED lighting elements arranged in at least one concentric circle.

19. The piezoelectric micropipette of claim 18, wherein the LED lighting elements in the lighting device are arranged and configured for phase contrast illumination.

20. The piezoelectric micropipette of claim 1, wherein the piezoelectric micropipette is mounted on a robotic arm, which enables a programmed movement of the piezoelectric micropipette between different spatial positions.

* * * * *